R. H. WILSON.
VACUUM TUBE VOLTMETER.
APPLICATION FILED AUG. 30, 1916.

1,287,161.   Patented Dec. 10, 1918.

Inventor:
Richard H. Wilson.
by   J. G. Roberts   Att'y.

UNITED STATES PATENT OFFICE.

RICHARD H. WILSON, OF EAST ORANGE, NEW JERSEY, ASSIGNOR TO WESTERN ELECTRIC COMPANY, INCORPORATED, OF NEW YORK, N. Y., A CORPORATION OF NEW YORK.

VACUUM-TUBE VOLTMETER.

1,287,161.            Specification of Letters Patent.      Patented Dec. 10, 1918.

Application filed August 30, 1916. Serial No. 117,627.

*To all whom it may concern:*

Be it known that I, RICHARD H. WILSON, a subject of the King of Great Britain, residing at East Orange, in the county of Essex and State of New Jersey, have invented certain new and useful Improvements in Vacuum-Tube Voltmeters, of which the following is a full, clear, concise, and exact description.

This invention relates to apparatus for the measurement of voltage.

Its object is to furnish an improved method and means for measuring the peak voltage between two points of an electrical net-work without introducing any complications in the said net-work, and as such is an improvement of the method found in the United States Patent to Heising No. 1,232,919.

A further object is to measure a direct or alternating voltage without the necessity of constant calibration of the measuring instrument, which calibration in the case of high-frequency measurements is often unsatisfactory.

These objects are accomplished by connecting the input circuit of a thermionic tube between the net-work terminals across which the voltage is to be measured and allowing the resulting unidirectional pulsating current in the output circuit to go through a resistance or impedance. A second vacuum tube has its input circuit arranged to include this impedance and the resulting pulsating voltage across this impedance tends to decrease the average value of the output current of the second tube, which is read on a suitable indicating instrument.

Figure 1:
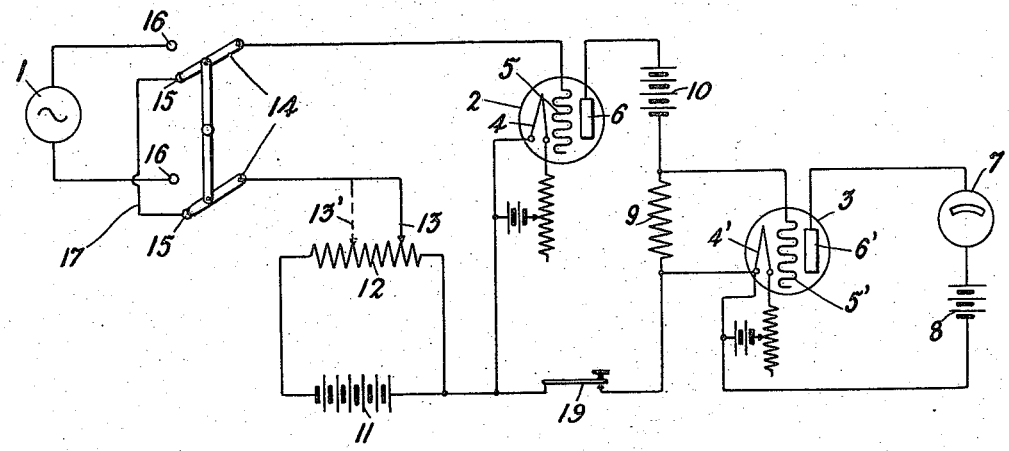
Figure 2:
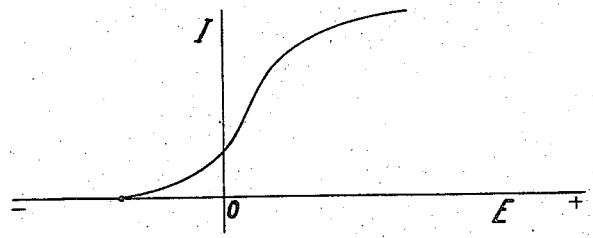

The nature of this invention and its method of use will be more fully explained in connection with the drawings, in which Figure 1 represents one circuit arrangement of this invention and Fig. 2 the characteristic curve for tubes of the audion type, similar to those used in this invention.

In the drawing, 1 represents a source of voltage to be measured; 2 and 3 are thermionic tubes of the audion type, the tube 2 comprising a heated cathode 4, a cool anode 6, and an auxiliary electrode 5, usually located between the cathode and anode. 4′, 5′, 6′ are corresponding electrodes for tube 3. In the vacuum tube 2 the hot cathode gives off electrons, which, due to the electric field set up between anode and cathode by means of battery 10, are driven across the evacuated space and strike the anode. When a voltage is impressed between the cathode 4 and the auxiliary electrode or grid 5, its effect is to change the number of electrons passing to it and therefore, the intensity of the current in the output circuit, as shown by Fig. 2, in which E is the difference of potential between the grid and the filament, and I the space current. The intensity of the current in the output circuit is determined by the voltage impressed upon its input terminals, and may be made zero by making the grid sufficiently negative with respect to the filament, as shown in Fig. 2. In the output circuit of tube 2 is also included a high impedance 9, which may be a resistance preferably of the order of 400,000 ohms, whose terminals furnish a drop of potential to actuate the input circuit of tube 3. This drop in potential affects the average value of the current from battery 8 flowing through the measuring instrument 7.

Battery 11, in combination with resistance 12 and contact-maker 13, supplies an adjustable voltage across the input terminals of the tube 2.

These facts furnish the basis of a method for measuring an unknown voltage, either alternating or direct, without constant calibration of the measuring instrument, in terms of a known voltage. The method of use for this purpose is as follows:

The switch 14 is thrown to the position 15, 15, in which position the input circuit is closed through the conductor 17. Assuming the negative potential on grid 5, due to battery 11, is small enough to allow current to flow between electrodes 4 and 6, there is a drop of voltage across resistance 9 in such a direction as to bring grid 5′ to a lower potential than filament 4′, and which, affecting the electric field between electrodes 4′ and 6′, due to battery 8 will cause a decrease in the reading of the current measuring instrument. Suppose that the contact maker 13 is adjusted until the negative voltage on the grid 5 just prevents any current flowing between electrodes 4 and 6. In this case the drop of potential across resistance 9 is zero, and a normal steady current will flow in the second tube. Let the contact 13 be changed now to a position where the grid 5 allows enough current to pass through tube 2, so that the reading of the measuring instrument 7 is changed one small unit, one micro-ampere for example. Designate this value of the negative voltage of battery 11 by the letter A. Now, throw the switch over to terminals 16, 16, which includes in the input circuit the voltage to be measured, its voltage being superimposed upon that already impressed. If the unknown voltage is an alternating one, it will raise the potential of the grid 5, with respect to the filament 4, once every cycle and will, therefore, cause a unidirectional pulse of current to flow in the output circuit of tube 2 once every cycle, thereby causing a decrease in the potential of grid 5' with respect to filament 4', and a decrease in the current through the indicating instrument 7. Let contact 13 be moved to a position 13' where the unknown voltage still being included in the circuit, the current reading of the instrument in the output circuit of tube 3 is decreased one small unit from its value for zero current through resistance 9, exactly as was done when the source 1 was not included. Call this value of the voltage from battery 11 equal to B. The difference, therefore, between A and B is the maximum value of source of voltage 1, the voltage that was to be measured. If a direct voltage is to be measured instead of an alternating one, the only precaution to be observed is that the sign of the direct voltage shall be opposite to that of the voltage impressed upon the input circuit by battery 11. In the practical use of the device, the resistance 13 should be marked off in terms of fall of potential along its length, as in any potentiometer system of measurement.

It is obvious that various changes may be made in the circuit without departing from the spirit of the invention. For example, a key 19 may be inserted in the output circuit of the first tube in order to give a further means of indicating the presence of current in said output circuit. If, on opening the key 19, no change is seen on the instrument 7, it proves that no current is flowing through the resistance 9.

What is claimed is:

1. A measuring instrument comprising a thermionic tube having an input circuit and an output circuit, a source of variable electromotive force in the input circuit of said tube, terminals for impressing upon said input circuit an electrical quantity to be measured, an impedance in the output circuit of said tube, and means for amplifying the voltage developed across this impedance, whereby the value of the electrical quantity to be measured can be more readily detected.

2. A voltmeter comprising a thermionic tube of the audion type, having an input circuit and an output circuit, a source of variable electromotive force in the input circuit of said thermionic tube, terminals for impressing upon said input circuit a voltage to be measured, a second thermionic tube, an impedance which is common to the output circuit of said first tube and to the input circuit of the second tube, and a current indicating instrument in the output circuit of said second tube.

3. In combination, two thermionic tubes of the audion type, each having an input circuit and an output circuit, a source of variable voltage in the input circuit of the first thermionic tube, a current indicating instrument in the output circuit of the second thermionic tube, and a resistance included in both the output circuit of said first thermionic tube and in the input circuit of said second thermionic tube.

4. The method of measuring an electrical quantity which consists in comparing the electrical values necessary to produce the same finite resultant space current both when the space current is influenced and when not influenced by the electrical quantity to be measured.

5. The method of measuring an electrical quantity by means of a vacuum tube of the audion type which consists in comparing the grid voltages necessary to produce the same finite resultant space current both when the space current is influenced and when not influenced by the electrical quantities to be measured.

6. A measuring instrument comprising a plurality of tubes in tandem, a known source of voltage and an unknown source of voltage associated with one of said tubes, and means associated with the output circuit of a tube subsequent to the first tube in the series for indicating the space current produced by said sources.

7. A voltmeter comprising a thermionic tube having an input circuit and an output circuit, a source of electromotive force in the input circuit of said tube, terminals for impressing upon said input circuit a voltage to be measured, a resistance in the output circuit of said tube, and means for amplifying the voltage developed across said resistance whereby the value of the voltage to be measured can be more readily detected.

In witness whereof, I hereunto subscribe my name this 29th day of August, A. D., 1916.

RICHARD H. WILSON.